US011516675B2

United States Patent
Frigout et al.

(10) Patent No.: US 11,516,675 B2
(45) Date of Patent: Nov. 29, 2022

(54) METHODS AND DEVICES FOR PAIRING IN A WIRELESS NETWORK

(71) Applicant: SAGEMCOM BROADBAND SAS, Rueil-Malmaison (FR)

(72) Inventors: Arnaud Frigout, Rueil Malmaison (FR); Stanislas Faye, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 17/635,905

(22) PCT Filed: Aug. 17, 2020

(86) PCT No.: PCT/EP2020/073016
§ 371 (c)(1),
(2) Date: Feb. 16, 2022

(87) PCT Pub. No.: WO2021/032691
PCT Pub. Date: Feb. 25, 2021

(65) Prior Publication Data
US 2022/0312218 A1 Sep. 29, 2022

(30) Foreign Application Priority Data
Aug. 21, 2019 (FR) ...................................... 1909317

(51) Int. Cl.
*G06F 21/00* (2013.01)
*H04W 12/08* (2021.01)
(Continued)

(52) U.S. Cl.
CPC ........... *H04W 12/55* (2021.01); *H04W 12/61* (2021.01); *H04W 76/10* (2018.02)

(58) Field of Classification Search
CPC ...... H04W 12/55; H04W 76/10; H04W 12/61
(Continued)

(56) References Cited

U.S. PATENT DOCUMENTS

| 8,078,873 | B2 * | 12/2011 | Shah | ..................... H04L 9/3271 713/168 |
| 9,007,957 | B2 * | 4/2015 | Birlik | ..................... H04W 12/06 370/254 |

(Continued)

FOREIGN PATENT DOCUMENTS

| CN | 111295868 A | * 6/2020 | ............. H04L 63/18 |
| WO | 2016/085582 A1 | 6/2016 | |

OTHER PUBLICATIONS

Oct. 6, 2020 Search Report issued in International Patent Application No. PCT/EP2020/073016.

*Primary Examiner* — Haresh N Patel
(74) *Attorney, Agent, or Firm* — Oliff PLC

(57) ABSTRACT

A method and device for pairing a terminal with an access point of a wireless communication network, the network including access points or executing access points, the executing access points coordinate in a centralised manner by an access point fulfilling the manager function, or managing access point. The method includes: —a message received from an executing access point including information that a terminal wishes to pair with the access point; —for each executing access point, information is obtained representing at least one time slot wherein the executing access point is authorised to establish a WPS pairing session with the new terminal, each time slot being separate from the other; —a message is sent to each executing access point including at least the information representing the at least one time slot wherein the executing access point is authorised to establish a WPS pairing session with the new terminal.

13 Claims, 6 Drawing Sheets

(51) Int. Cl.
    *H04L 29/06*     (2006.01)
    *H04W 12/55*     (2021.01)
    *H04W 76/10*     (2018.01)
    *H04W 12/61*     (2021.01)

(58) Field of Classification Search
    USPC .......................................................... 726/2
    See application file for complete search history.

(56) References Cited

U.S. PATENT DOCUMENTS

| | | | |
|---|---|---|---|
| 9,107,028 B2* | 8/2015 | Lovitt | H04W 12/06 |
| 9,119,079 B2* | 8/2015 | Soyak | H04K 3/822 |
| 2012/0252405 A1* | 10/2012 | Lortz | H04W 4/50 |
| | | | 455/410 |
| 2012/0254960 A1* | 10/2012 | Lortz | H04L 63/104 |
| | | | 726/3 |
| 2013/0166910 A1* | 6/2013 | Wilkinson | H04L 9/0861 |
| | | | 713/168 |
| 2014/0080491 A1 | 3/2014 | Tinnakornsrisuphap et al. | |
| 2014/0359732 A1* | 12/2014 | Kuroda | H04W 12/069 |
| | | | 726/6 |
| 2015/0381594 A1* | 12/2015 | Venkatesan | G06F 16/955 |
| | | | 726/6 |
| 2016/0157225 A1 | 6/2016 | Joshi et al. | |
| 2016/0262163 A1 | 9/2016 | Gonzalez Garrido et al. | |
| 2017/0237736 A1* | 8/2017 | Eber | H04B 5/0031 |
| | | | 726/4 |
| 2017/0257750 A1* | 9/2017 | Gunasekara | H04W 4/90 |
| 2019/0215704 A1 | 7/2019 | Thubert et al. | |
| 2020/0154328 A1* | 5/2020 | Strater | H04W 36/385 |

\* cited by examiner

METHODS AND DEVICES FOR PAIRING IN A WIRELESS NETWORK

TECHNICAL FIELD

The invention relates to a method for pairing a terminal with an access point of a wireless communication network comprising a plurality of access points.

PRIOR ART

A wireless communication network in accordance with one of the IEEE 802.11 standards typically comprises a plurality of electronic devices comprising at a minimum a radio-frequency module for establishing communications in accordance with one of the IEEE 802.11 standards, or in other words in accordance with one of the Wi-Fi (registered trade mark) standards. Such a network typically comprises an electronic device commonly referred to as an access point (or AP) and a plurality of electronic devices known as terminals (or users) able to establish wireless connections with the access point and/or with each other. In a residential environment, the access point is typically provided by an internet operator, i.e. a home gateway (or residential gateway). The terminals are typically computers, televisions, tablets or telephones known as smartphones. It is thus commonly said that the terminals are associated "in Wi-Fi" with the access point.

Systems for extending wireless communication coverage may be used in order to increase the range of these wireless communication networks by coordinating a plurality of distributed access points AP. These various access points all make available one and the same wireless local area network WLAN. In the context of Wi-Fi technology, all these access points AP thus use one and the same SSID identifier (Service Set IDentifier) and one and the same password (also referred to as a security key). Thus the extension of wireless communication coverage is transparent for the devices connected to the wireless local area network WLAN.

The user of a terminal wishing to connect to a Wi-Fi network must conventionally provide an SSID identifier (Service Set IDentifier) of the network and a password (also referred to as a security key). In order to improve the security of such connections and in particular to allow the use of complex passwords, the WFA (Wi-Fi Alliance) has defined a so-called WPS (Wi-Fi Protected Setup) protocol making it possible to easily associate a new terminal with an existing Wi-Fi network. This protocol enables two items of equipment (for example a computer and an access point) to connect to each other, for example when a user presses on a physical or virtual button on the two items of equipment within a certain amount of time, for example two minutes. The two items of equipment will then recognise each other and the access point will supply to the terminal all the information necessary for its connection, in particular the SSID and the password, without the user having to provide them.

The WPS protocol also defines particular mechanisms making it possible to avoid a terminal connecting to a Wi-Fi network other than the one to which it wishes to connect in the case where a WPS session is in progress on this other Wi-Fi network. Likewise, the WPS protocol defines particular mechanisms making it possible to avoid a stranger terminal connecting to the Wi-Fi network of the user. These cases are cases of overlap.

For this purpose, provision is made for an access point, referred to as the current access point, to be listening to the other WPS sessions in progress on other access points. If a WPS session is in progress on another access point, then the current access point ends its own WPS session. Provision is also made for a terminal to scan all the channels that it supports in order to seek a WPS session on an access point. If it detects a plurality of these, it must end its own session and warn the user, except in a particular case described below. The WPS protocol thus avoids a terminal connecting to a network other than the one expected since this other network would have a WPS session in progress at the same moment. The current WPS protocol does not make it possible to have a plurality of WPS sessions on the same frequency band. However, in the particular case of a multiband access point (e.g. 2.4 GHz and 5 GHz), having a WPS session at the same time on each of the bands is tolerated provided that the two sessions have the same UUID identifier (standing for Universally Unique IDentifier). A terminal detecting these two sessions should therefore not end its own session.

Defining a single access point for responding to WPS connection requests makes it possible to avoid certain cases of overlap. However, a terminal remote from this particular access will not be able to connect to the network when it may be closer spatially to another access point.

It is then desirable to overcome these drawbacks of the prior art.

DISCLOSURE OF THE INVENTION

The aim of the present invention is to solve the drawbacks of the prior art by proposing a device and a method for pairing a terminal with an access point of a wireless communication network that enables a single access point to respond to a Wi-Fi connection request such as for example a WPS connection request whatever the position of the terminal in the wireless communication network.

For this purpose, the invention relates to a method for pairing a terminal with an access point of a wireless communication network, said network comprising a plurality of access points referred to as executing access points, the executing access points being coordinated in a centralised manner by an access point fulfilling the function of manager, referred to as the managing access point, characterised in that the method comprises the following steps performed by the managing access point of:
  receiving a message from an executing access point comprising information indicating that a terminal wishes to pair with said access point;
  obtaining, for each executing access point, information representing at least one time slot for which the executing access point is authorised to establish a WPS pairing session with the new terminal, each time slot being separate from the other time slots;
  sending a message to each executing access point comprising at least the information representing the at least one time slot for which the executing access point is authorised to establish a WPS pairing session with the new terminal.

The invention also relates to a method for pairing a terminal with an access point of a wireless communication network, said network comprising a plurality of access points referred to as executing access points, the executing access points being coordinated in a centralised manner by an access point fulfilling the function of manager, referred to as the managing access point, characterised in that the method comprises the following steps performed by at least one executing access point of:

receiving a message comprising information indicating that said terminal wishes to pair with said access point;

sending a message to said managing access point, the message comprising information indicating that said terminal wishes to pair with said access point;

receiving a message from the managing access point comprising information representing at least one time slot for which the executing access point is authorised to establish a WPS pairing session with the new terminal;

adding, in at least one beacon frame of said access point, information indicating that a pairing session is active, solely during the period of the at least one time slot for which the executing access point is authorised to establish a WPS pairing session with the new terminal.

The invention also relates to a device for pairing a terminal with an access point of a wireless communication network, said network comprising a plurality of access points referred to as executing access points, the executing access points being coordinated in a centralised manner by an access point fulfilling the function of manager, referred to as the managing access point, characterised in that the device is included in the managing access point and comprises:

means for receiving a message from an executing access point comprising information indicating that a terminal wishes to pair with said access point;

means for obtaining, for each executing access point, information representing at least one time slot for which the executing access point is authorised to establish a WPS pairing session with the new terminal, each time slot being separate from the other time slots;

means for sending a message to each executing access point comprising at least the information representing the at least one time slot for which the executing access point is authorised to establish a WPS pairing session with the new terminal.

The invention also relates to a device for pairing a terminal with an access point of a wireless communication network, said network comprising a plurality of access points referred to as executing access points, the executing access points being coordinated in a centralised manner by an access point fulfilling the function of manager, referred to as the managing access point, characterised in that the device is included in at least one executing access point and comprises:

means for receiving a message comprising information indicating that said terminal wishes to pair with said access point;

means for sending a message to said managing access point, the message comprising information indicating that said terminal wishes to pair with said access point;

means for receiving from the managing access point a message comprising information representing at least one time slot for which the executing access point is authorised to establish a WPS pairing session with the new terminal;

means for adding, in at least one beacon frame of said access point, information indicating that a pairing session is active, solely during the period of the at least one time slot for which the executing access point is authorised to establish a WPS pairing session with the new terminal.

According to a particular embodiment, the method further comprises a step of:

receiving from an executing access point a message comprising information indicating that the WPS pairing session has failed during the period of the at least one time slot, obtaining, for each executing access point, information representing at least one time slot for which the executing access point is authorised to establish a WPS pairing session with the new terminal, each time slot being separate from the other time slots;

sending a message to each executing access point comprising at least the information representing the at least one time slot for which the executing access point is authorised to establish a WPS pairing session with the new terminal.

According to a particular embodiment, the method further comprises a step of:

receiving a message from an executing access point comprising information indicating that the WPS pairing session failed during the period of the at least one time slot, sending a message to another executing access point indicating that the other executing access point is authorised to establish a WPS pairing session with the new terminal.

According to a particular embodiment, the time slots have identical durations.

According to a particular embodiment, at least one time slot has a duration different from the other time slots.

According to a particular embodiment, at least two time slots are allocated to an executing access point.

According to a particular embodiment, the message comprising information representing at least one time slot for which the executing access point is authorised to establish a WPS pairing session with the new terminal further comprises at least one item of information identifying at least one other executing access point, and the method further comprises a step of:

sending a message to the other executing access point indicating that the other executing access point is authorised to establish a WPS pairing session with the new terminal.

The present invention also relates to a computer program that can be stored on a medium and/or downloaded from a communication network, in order to be read by a device. This computer program comprises instructions for implementing the method mentioned above according to any one of the variants thereof, when the program is executed by a computing unit of the device. The invention also relates to storage means comprising such a computer program.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
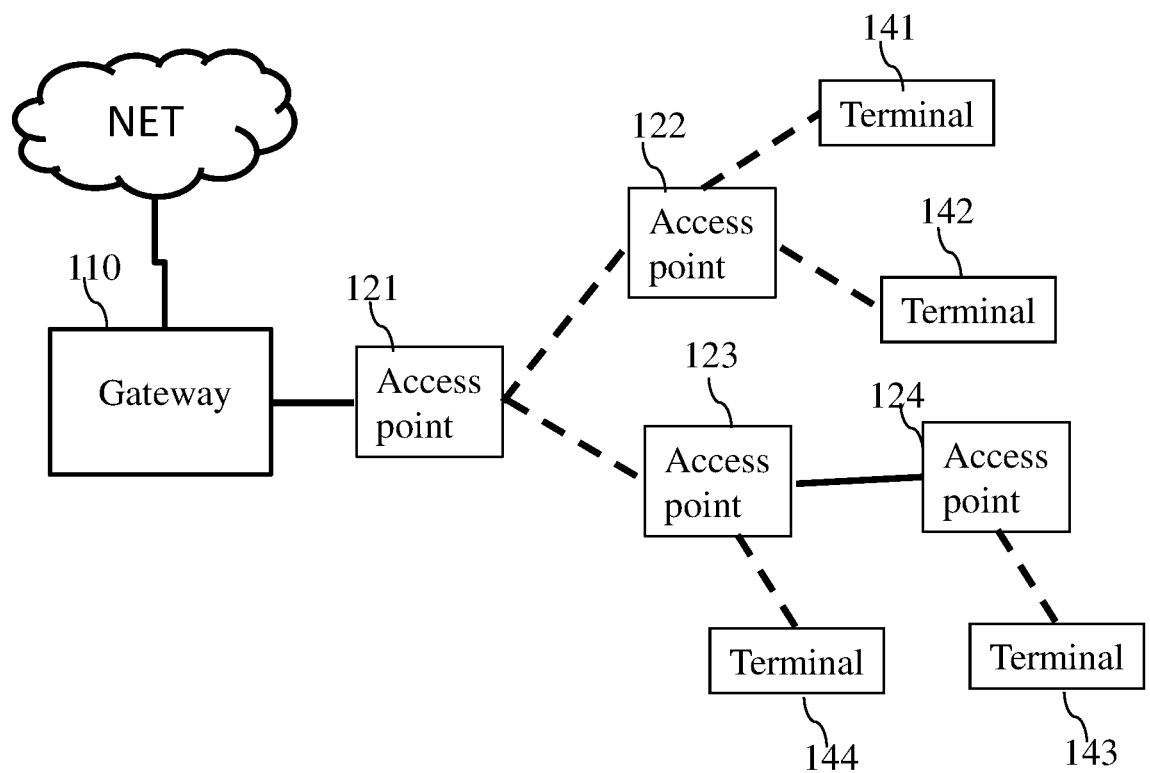
FIG. 1 shows schematically a wireless communication system in which the present invention can be implemented.

FIG. 1 illustrates schematically a wireless communication system in which the present invention can be implemented.

The communication system comprises a set of interconnected access points AP to a wireless local area network WLAN 121, 122, 123 and 124. The access points all make available one and the same wireless local area network WLAN (same name etc.).

In the context of Wi-Fi technology and of the present invention, all the access points AP can use an SSID identifier and a password that are identical or different.

The access points are interconnected by means of cable connections, for example of the Ethernet type, or by means of wireless connections, for example a Wi-Fi connection using an SSID identifier different from said wireless local area network WLAN itself. It should be noted that there may be a plurality of access points in one and the same item of physical equipment (for example an internet gateway such as the gateway 110, a Wi-Fi extender, or a television set-top box that would fulfil the role of Wi-Fi network extender). These access points may operate in the same frequency band or on different bands.

By way of illustration, FIG. 1 shows that the access point 121 is connected to the access point 122 and to the access point 123 by means of a wireless connection shown in broken lines (distinct from the wireless local area network WLAN itself), and the access point 124 is connected to the access point 123 by means of a cable connection shown in a continuous line.

The system for extending wireless communication coverage thus makes it possible to interconnect a gateway 110 for access to the internet, a terminal 141, a terminal 142, a terminal 143 and a terminal 144. The terminal 141 is for example a smartphone connected by a wireless connection to the access point 122, i.e. the terminal 141 is thus connected via the wireless local area network WLAN by means of the access point 122. The terminal 142 is for example a PC connected by a cable connection to the access point 122. The terminal 143 is for example a tablet connected by a wireless connection to the access point 124, i.e. the terminal 143 is thus connected via the wireless local area network WLAN by means of the access point 124. The terminal 144 is for example a network attached storage unit NAS connected by a wireless connection to the access point 123, i.e. the terminal 144 is thus connected via the wireless local area network WLAN by means of the access point 123.

In such a system, each access point may be a manager or an executer. At a given instant, there is a single managing access point in the whole of the network. The managing access point can be designated by fixed configuration or dynamically by election. The managing access point is for example the access point that is closest to the gateway 110 for access to the internet, namely the access point 121 in the context of FIG. 1. The other access points are then executers.

The active managing access point may for example be selected from the serial numbers of the access points present. In a particular embodiment, the access point having the lowest serial number is selected as manager. In a variant, the managing access point is selected by a user via a man-machine interface.

The managing access point communicates with the executing access points by means of a communication bus. The ISM bus described in the patent application EP2791798 is an example of such a communication bus. This is because the managing access point needs to know the executing devices present on the network. The executing devices do not communicate with each other.

Figure 2:
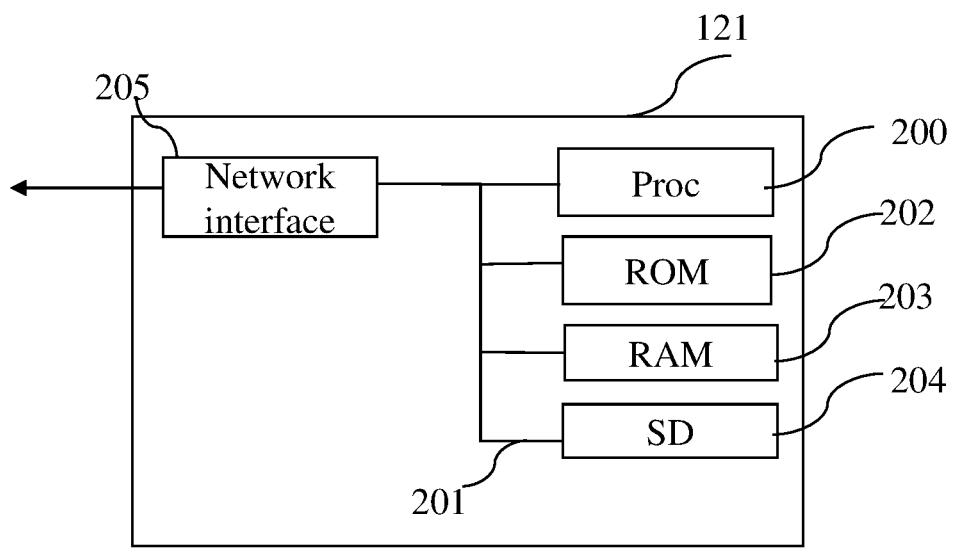
FIG. 2 illustrates schematically an example of hardware architecture of an access point according to the present invention.

FIG. 2 illustrates schematically an example of hardware architecture of an access point according to the present invention.

The access point comprises:
a processor, microprocessor or microcontroller 200;
a volatile memory 203;
a non-volatile memory 202;
optionally a storage medium reader 204 such as an SD card (Secure Digital Card) reader or a hard disk;
a network interface 205 comprising one or more Wi-Fi network interfaces 205 and optionally a cabled communication module;
a communication bus 201 connecting the processor 200 to the ROM memory 202, to the RAM memory 203, to the storage medium reader 204 and to the network interface 205.

The processor 200 is capable of executing instructions loaded in the volatile memory 203 from the non-volatile memory 202, from an external memory (not shown), from a storage medium, such as an SD card or the like, or from a communication network. When the access point is powered up, the processor 200 is capable of reading instructions from the volatile memory 203 and executing them. These instructions form a computer program that causes the implementation, by the processor 200, of all or part of the method described in relation to FIG. 3 or 4 or 5 or 6.

All or part of the method described in relation to FIG. 3 or 4 or 5 or 6 can be implemented in software form by executing a set of instructions by a programmable machine, such as a DSP (Digital Signal Processor) or a microcontroller or be implemented in hardware form by a machine or a dedicated component, such as an FPGA (field-programmable gate array) or an ASIC (application-specific integrated circuit).

Figure 3:
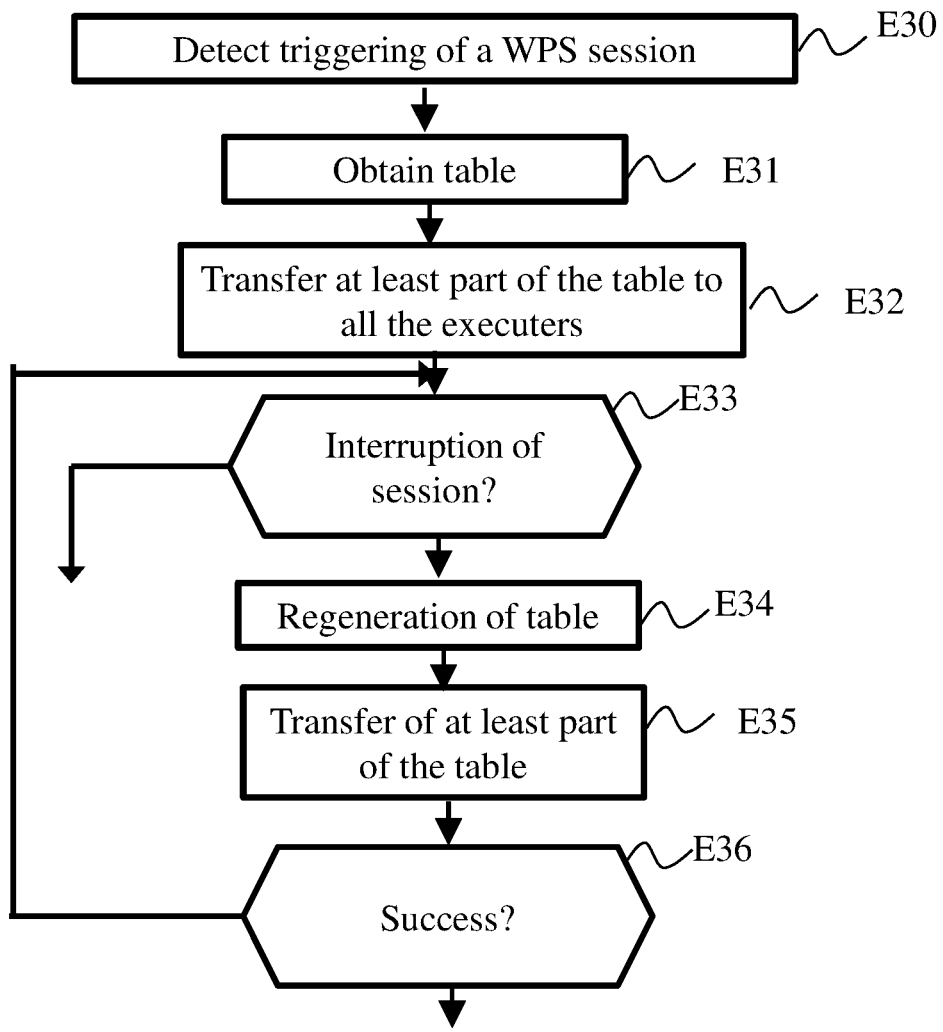
FIG. 3 shows a first example of an algorithm executed by an access point when it is a manager according to the present invention.

FIG. 3 shows a first example of an algorithm executed by an access point when it is a manager according to the present invention.

At the step E30, the managing access point detects the triggering by a user of a WPS session request or demand. Such a session is triggered for example by pressing on a physical button of one of the access points of the system. According to a variant, such a session is triggered by pressing on a virtual button on a man-machine interface associated with one of the access points of the system.

The WPS session may be triggered on the managing access point or on an executing access point.

When the WPS session is triggered on an executing access point, the managing access point receives a message from the access point that detected the pressing on the button.

At the step E31, the managing access point obtains a table that comprises the information on the distribution of the authorisations to proceed with establishing a WPS session with a new terminal. The access point managing the WPS connection has the role of establishing the scenario to be established for successfully completing the WPS pairing. This scenario defines the sequence of distributing a ticket as well as the duration of validity thereof. The table comprises, for each executer, information representing the time slot or slots for which the executing access point is authorised to establish a WPS session with the new terminal, and the order in which the executing access point is authorised to establish a WPS session with the new terminal.

For example, the managing access point comprises in its memory various tables and selects one of them according to the access point that detected the pressing of the WPS button. In a variant the managing access point determines the table in real time according to the access point that detected the pressing on the WPS button.

At the following step E32, the managing access point demands the transfer of at least part of the table obtained from each executer. For example, the managing access point demands the transfer, to each executing access point, of the information representing the time slot or slots for which the executing access point is authorised to establish a WPS session with the new terminal as well as the identifier of the next executing access point that, if the WPS session is not established, will be authorised to establish a WPS session with the new terminal. For example, the managing access point transfers to each executing access point all the information included in the table.

At the following step E33, the managing access point checks whether a message representing a failure of the WPS session is received.

If so, the managing access point passes to the step E34, and if not the managing access point passes to the step E36.

At the step E34, the managing access point generates or selects a new table. For example, the managing access point may once again give authorisation to the last executing access point authorised so that it again attempts to establish a WPS session or to modify the order of the table obtained at the step E31.

At the following step E35, the managing access point demands the transfer of at least part of the table generated or selected at the step E34 to each executer. For example, the managing access point demands the transfer, to each executing access point, of the information representing the time slot or slots for which the executing access point is authorised to establish a WPS session with the new terminal as well as the identifier of the next executing access point that, if the WPS session is not established, will be authorised to establish a WPS session with the new terminal. For example, the managing access point transfers, to each executing access point, all the information included in the table.

At the step E36, the managing access point checks whether a message informing it of the success of the pairing of the new terminal is received.

If so, the managing access point interrupts the present algorithm. If not, the managing access point returns to the step E33.

The method according to the invention advantageously enables a terminal to connect to a given network comprising a plurality of access points located or not in the same frequency band while preserving the simplicity of use of the WPS protocol. Starting a WPS session on these various access points is consequently possible. This solution is particularly advantageous in the case where a plurality of access points belong to the same network and are located in the same frequency band, as is the case with systems for extending wireless communication coverage ("extenders").

Figure 4:
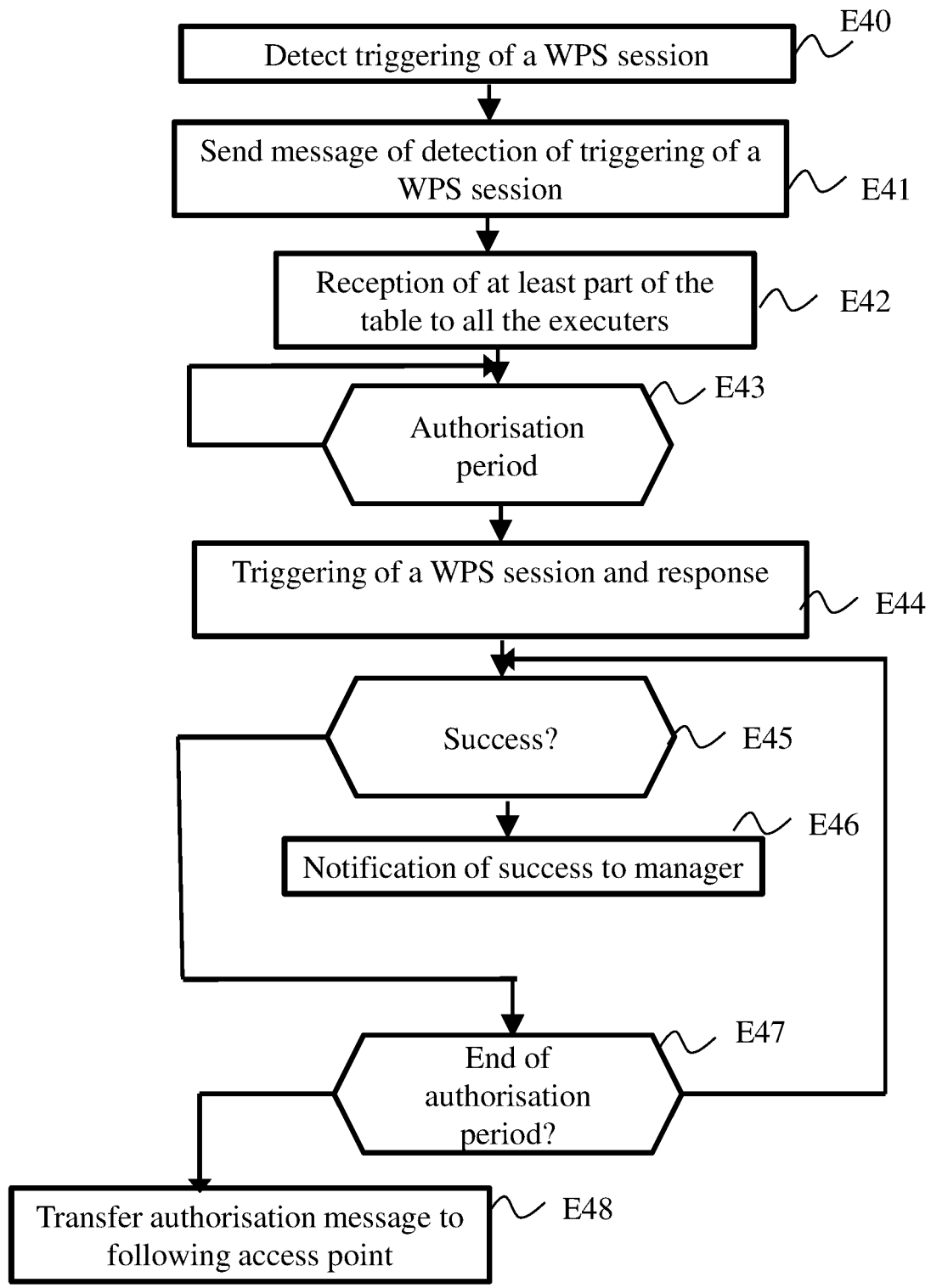
FIG. 4 shows a first example of an algorithm executed by an access point when it is an executer according to the present invention.

FIG. 4 shows a first example of an algorithm executed by an access point when it is an executer according to the present invention.

At the step E40, the executing access point detects a pressing on a button for triggering a WPS session demand.

At the following step E41, the executing access point transfers a message to the managing access point indicating that a WPS session is triggered.

At the following step E42, the executing access point receives from the managing access point a message that comprises information representing the time slot or slots for which the executing access point is authorised to establish a WPS session with the new terminal as well as the identifier of the next executing access point that, if the WPS session is not established, will be authorised to establish a WPS session with the new terminal. In a variant, the executing access point receives from the managing access point a message comprising the table as described at the step E31 of FIG. 3.

At the step E43, the executing access point checks, with its internal clock, whether it is in the time period for which it is authorised to establish a WPS session.

If so, the executing access point passes to the step E44. If not, the executing access point reiterates the step E43.

At the step E44, the executing access point adds, in at least one beacon frame, information indicating that a pairing session is active. This addition is made solely in the period during which it is authorised to establish a pairing session. In other words, an executing access point does not add in its beacon frames information indicating that a pairing session is active. The absence of this information in the beacon frames broadcast by the point makes it impossible for another access point or a terminal to detect an overlap situation.

At the step E45, the executing access point checks whether the WPS pairing has succeeded.

If so, the executing access point passes to the step E46. If not, the executing access point passes to the step E47.

At the step E46, the executing access point transfers to the managing access point a message representing the success of the WPS pairing with the terminal.

At the step E47, the executing access point checks whether the time period for which it is authorised to establish a WPS session has ended.

If so, the executing access point passes to the step E48. If not, the executing access point returns to the step E45.

At the step E48, the executing access point transfers a message to the next executing access point identified in the message received at the step E42, indicating to it that it is authorised to establish a WPS session with the new terminal.

Figure 5:
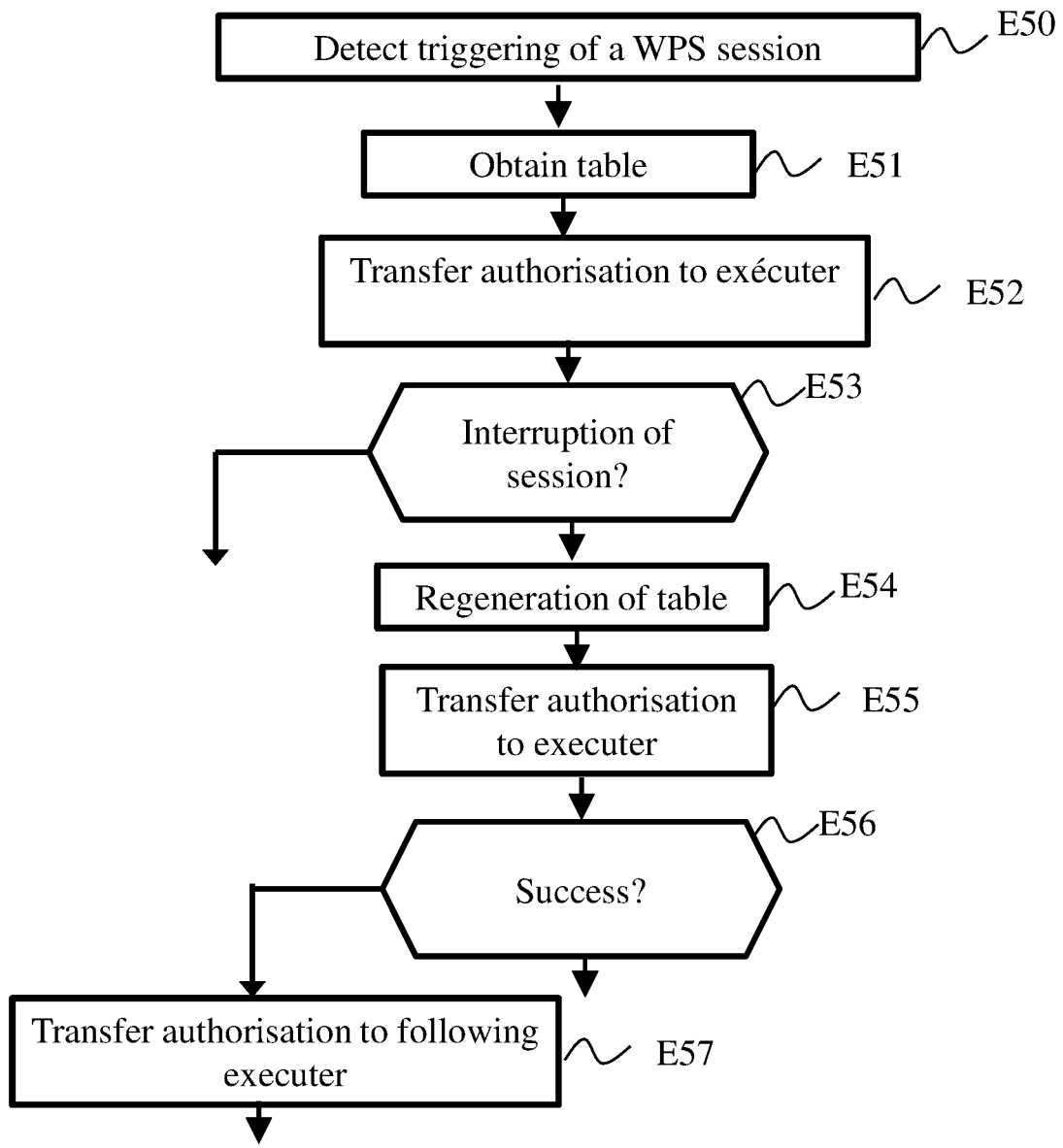
FIG. 5 shows a second example of an algorithm executed by an access point when it is a manager according to the present invention.

FIG. 5 shows a second example of an algorithm executed by an access point when it is a manager according to the present invention.

At the step E50, the managing access point detects the triggering by a user of a WPS session demand. The demand for triggering such a session is made for example by pressing on a physical button of one of the access points of the system. According to a variant, such a session is triggered by pressing on a virtual button of a man-machine interface associated with one of the access points of the system.

The WPS session can be triggered on the managing access point or on an executing access point.

When the WPS session is triggered on an executing access point, the managing access point receives a message from the access point that detected the pressing on the button.

At the step E51, the managing access point obtains a table that comprises the information on the distribution of the authorisations to proceed with establishing a WPS session with a new terminal. The role of the access point managing a WPS connection is to establish the scenario to be established to successfully complete the WPS pairing. This scenario defines the sequence for distributing a ticket as well as the duration of the validity thereof. The table comprises, for each executer, information representing the time slot or slots for which the executing access point is authorised to establish a WPS session with the new terminal, and the order in which the executing access point is authorised to establish a WPS session with the new terminal.

For example, the managing access point comprises various tables in its memory and selects one of them according to the access point that detected the pressing on the WPS button. In a variant, the managing access point determines the table in real time according to the access point that detected the pressing on the WPS button.

At the following step E52, the managing access point demands the transfer of information representing the time slot or slots to each executing access point in the table. The first executing access point is thus authorised to establish a WPS session with the new terminal.

At the following step E53, the managing access point checks whether a message representing a failure of the WPS session is received.

If so, the managing access point passes to the step E54, if not, the managing access point passes to the step E56.

At the step E54, the managing access point generates or selects a new table. For example, the managing access point may once again give the authorisation to the last executing access point authorised for it to reattempt to establish a WPS session or to modify the order of the table obtained at the step E51.

At the following step E55, the managing access point demands the transfer of information representing the time slot or slots to the executing access points in the table as obtained at the step E54.

At the step E56, the managing access point checks whether a message informing the managing access point of the success of the pairing of the new terminal is received.

If so, the managing access point interrupts the present algorithm. If not, the managing access point returns to the step E53 if the time slot in which the first executing access point is authorised to establish a WPS session with the new terminal has not elapsed or, if a message representing the failure of the WPS session is received, passes to the step E57.

At the following step E57, the managing access point demands the transfer of information representing the time slot or slots, for the following executing access point in the table, authorising it to establish a WPS session with the new terminal and returns to the step E53.

The method according to the invention advantageously enables a terminal to connect to a given network comprising a plurality of access points located or not in the same frequency band while preserving the simplicity of use of the WPS protocol. Starting a WPS session on these various access points is consequently possible. This solution is particularly advantageous in the case where a plurality of access points belong to the same network and are located in the same frequency band, as is the case with the systems for extending wireless communication coverage ("extenders").

Figure 6:
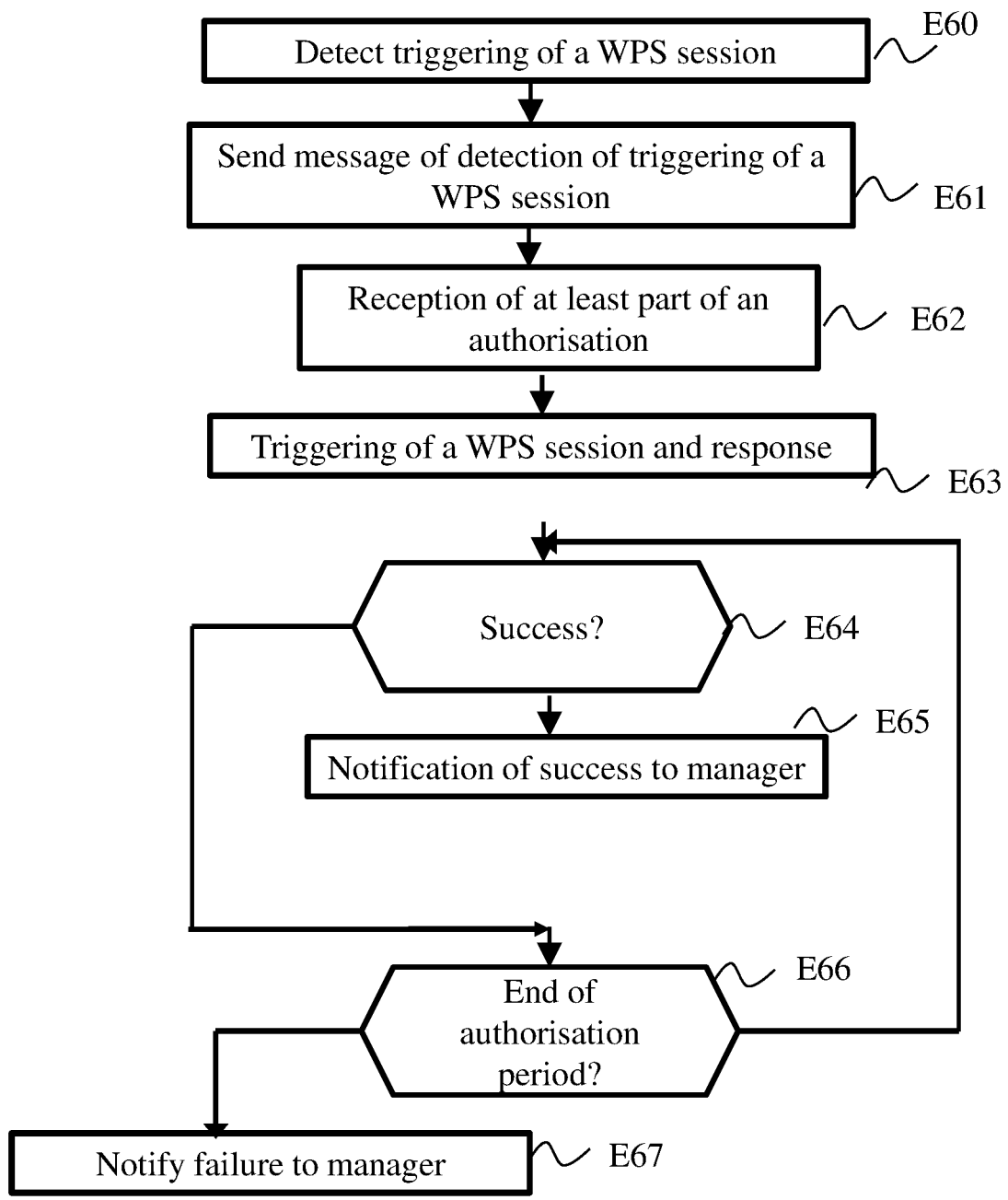
FIG. 6 shows a second example of an algorithm executed by an access point when it is an executer according to the present invention.

FIG. 6 shows a second example of an algorithm executed by an access point when it is an executer according to the present invention.

At the step E60, the executing access point detects a pressing on a button for triggering a WPS session.

At the following step E61, the executing access point transfers a message to the managing access point indicating that a WPS session is triggered.

At the following step E62, the executing access point receives from the managing access point a message that comprises information representing the time slot or slots for which the executing access point is authorised to establish a WPS session with the new terminal.

At the step E63, the executing access point adds, in at least one beacon frame, information indicating that a pairing session is active. This addition is made solely in the period during which it is authorised to establish a pairing session. In other words, an executing access point does not add, in its beacon frames, information indicating that a pairing session is active. The absence of this information in the beacon frames broadcast by the point makes it impossible for another access point or a terminal to detect an overlap situation.

At the step E64, the executing access point checks whether the WPS pairing has succeeded.

If so, the executing access point passes to the step E66. If not, the executing access point passes to the step E65.

At the step E65, the executing access point transfers to the managing access point a message representing the success of the WPS pairing with the terminal.

At the step E66, the executing access point checks whether the time period for which it is authorised to establish a WPS session has ended.

If so, the executing access point passes to the step E67. If not, the executing access point returns to the step E64.

At the step E67, the executing access point transfers to the managing access point a message representing the failure of the WPS pairing.

Figure 7:
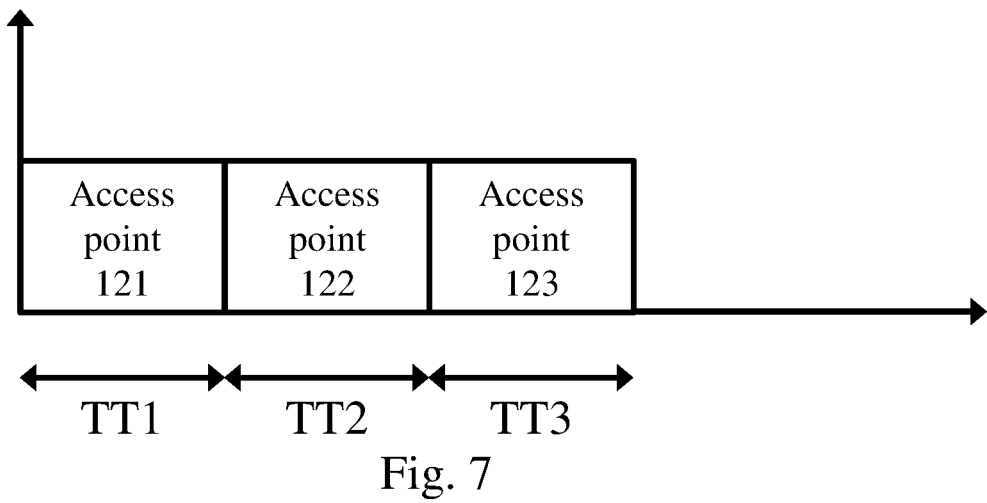
FIG. 7 shows a first example of the distribution in the time domain of an authorisation to establish a WPS session.

FIG. 7 shows a first example of the distribution in the time domain of an authorisation to establish a WPS session.

In the example in FIG. 7, the managing access point distributes the time allocated for a pairing of a new terminal in a WPS session equally to each access point executing equally.

A time slot of the same duration is allocated to each executer.

The access point 124 is for example the managing access point. In the time slot TT1 the access point 121 is authorised to establish a WPS session with the new terminal, in the time slot TT2 the access point 122 is authorised to establish a WPS session with the new terminal and in the time slot TT3 the access point 123 is authorised to establish a WPS session with the new terminal.

Figure 8:
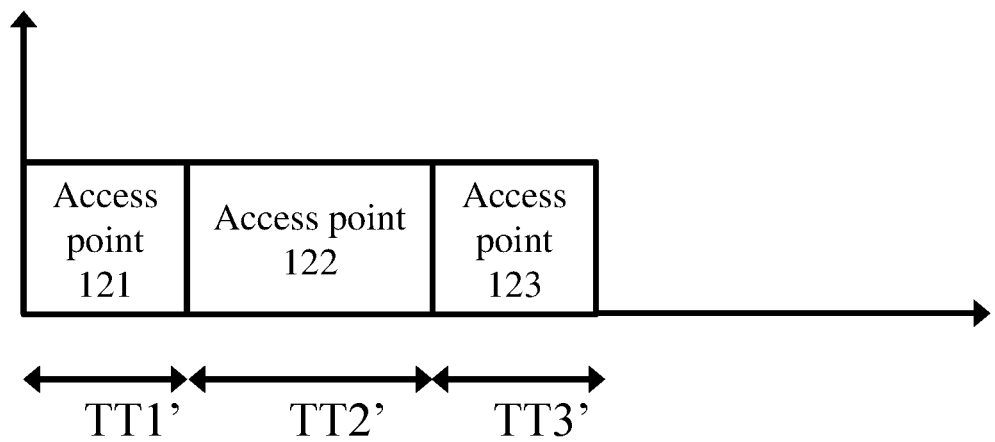
FIG. 8 shows a second example of the distribution in the time domain of an authorisation to establish a WPS session.

FIG. 8 shows a second example of the distribution in the time domain of an authorisation to establish a WPS session.

In the example in FIG. 8, the managing access point distributes the time allocated for a pairing of a new terminal in a WPS session unequally to each access point executing equally.

A time slot is allocated to each executer.

The access point 124 is for example the managing access point. In the time slot TT1' the access point 121 is authorised to establish a WPS session with the new terminal, in the time slot TT2' the access point 122 is authorised to establish a WPS session with the new terminal and in the time slot TT3' the access point 123 is authorised to establish a WPS session with the new terminal.

Figure 9:
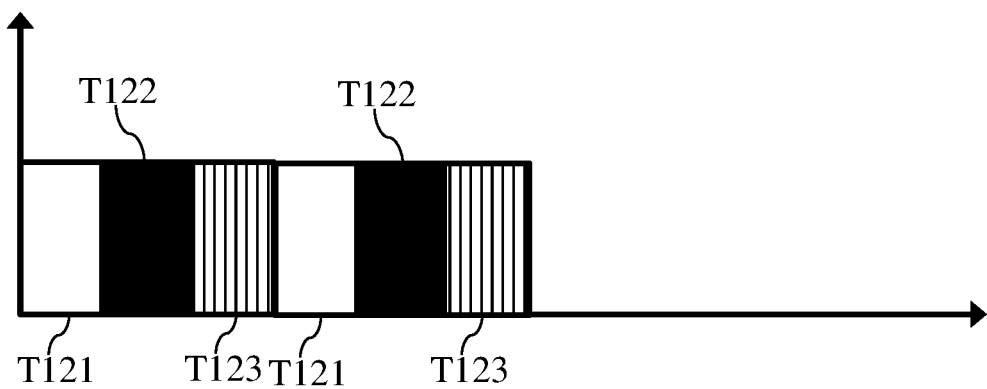
FIG. 9 shows a third example of the distribution in the time domain of an authorisation to establish a WPS session.

FIG. 9 shows a third example of the distribution in the time domain of an authorisation to establish a WPS session.

In the example in FIG. 9, the managing access point distributes the time allocated for a pairing of a new terminal in a WPS session equally to each access point executing equally. Naturally, the distribution of the time allocated may be different between the executing access points.

A plurality of time slots of the same duration are allocated to each executer.

The access point 124 is for example the managing access point. In the time slots T121, the access point 121 is authorised to establish a WPS session with the new terminal, in the time slots T122 the access point 122 is authorised to establish a WPS session with the new terminal and in the time slots TT3 the access point 123 is authorised to establish a WPS session with the new terminal.

The invention claimed is:

1. A method for pairing a terminal with an access point of a wireless communication network, the network comprising a plurality of access points referred to as executing access points, the executing access points being coordinated in a centralized manner by an access point fulfilling the function of manager, referred to as the managing access point, wherein the method causing the managing access point to perform:
   receiving a message from the executing access point comprising information indicating that a new terminal wishes to pair with the access point;
   obtaining, for each of the executing access points, information representing at least one time slot for which the executing access point is authorized to establish a Wi-Fi Protected Setup (WPS) pairing session with the new terminal, each of the time slots being separate from the other time slots;
   sending a message to each executing access point comprising at least the information representing the at least one time slot for which the executing access point is authorized to establish the WPS pairing session with the new terminal.

2. A non-transitory recording medium embodying a computer program comprising instructions for implementing, by a device, the method according to claim 1, when the program is executed by the device.

3. The method according to claim 1, wherein the method causing the managing access point to perform:
   receiving from an executing access point a message comprising information indicating that the WPS pairing session has failed during the period of the at least one time slot,
   obtaining, for each executing access point, information representing at least one time slot for which the executing access point is authorized to establish a WPS pairing session with the new terminal, each time slot being separate from the other time slots;
   sending a message to each executing access point comprising at least the information representing the at least one time slot for which the executing access point is authorized to establish a WPS pairing session with the new terminal.

4. The method according to claim 1, wherein the method causing the managing access point to perform:
   receiving a message from an executing access point comprising information indicating that the WPS pairing session failed during the period of the at least one time slot,
   sending a message to another executing access point indicating that the other executing access point is authorized to establish a WPS pairing session with the new terminal.

5. The method according to claim 1, wherein in that the time slots have identical durations.

6. The method according to claim 1, wherein at least one time slot has a duration different from the other time slots.

7. The method according to claim 1, wherein at least two time slots are allocated to an executing access point.

8. A method for pairing a new terminal with an access point of a wireless communication network, the network comprising a plurality of access points referred to as executing access points, the executing access points being coordinated in a centralized manner by an access point fulfilling the function of manager, referred to as the managing access point, wherein the method causing at least one executing access point to perform:
   receiving a message comprising information indicating that the new terminal wishes to pair with the access point;
   sending a message to the managing access point, the message comprising information indicating that the new terminal wishes to pair with the access point;
   receiving a message from the managing access point comprising information representing at least one time slot for which the executing access point is authorized to establish a Wi-Fi Protected Setup (WPS) pairing session with the new terminal;
   adding, in at least one beacon frame of the access point, information indicating that the pairing session is active, solely during the period of the at least one time slot for which the executing access point is authorized to establish a WPS pairing session with the new terminal.

9. The method according to claim 8, wherein, if the WPS pairing session fails during the period of the at least one time slot, the method causing at least one executing access point to perform:
   sending a message to the managing access point, the message comprising information indicating that the WPS pairing session has failed during the period of the at least one time slot.

10. The method according to claim 8, wherein, if the WPS pairing session fails after the period of the at least one time slot, the method causing at least one executing access point to perform:
    sending a message to the managing access point, the second message comprising information indicating that the WPS pairing session has failed during the period of the at least one time slot.

11. The method according claim 8 wherein the message comprising information representing at least one time slot for which the executing access point is authorized to establish a WPS pairing session with the new terminal further comprises at least one item of information identifying at least one other executing access point, the method causing at least one executing access point to perform:
    sending a message to the other executing access point indicating that the other executing access point is authorized to establish a WPS pairing session with the new terminal.

12. A device for pairing a terminal with an access point of a wireless communication network, the network comprising a plurality of access points referred to as executing access points, the executing access points being coordinated in a centralized manner by an access point fulfilling the function of manager, referred to as the managing access point, wherein the device is included in the managing access point and comprises circuitry causing the device to perform:

receiving a message from the executing access point comprising information indicating that a new terminal wishes to pair with the access point;

obtaining, for each of the executing access point, information representing at least one time slot for which the executing access point is authorized to establish a Wi-Fi Protected Setup (WPS) pairing session with the new terminal, each of the time slots being separate from the other time slots;

sending a message to each executing access point comprising at least the information representing the at least one time slot for which the executing access point is authorized to establish the WPS pairing session with the new terminal.

13. A device for pairing a new terminal with an access point of a wireless communication network, the network comprising a plurality of access points referred to as executing access points, the executing access points being coordinated in a centralized manner by an access point fulfilling the function of manager, referred to as the managing access point, wherein the device is included in at least one executing access point and comprises circuitry causing the device to perform:

receiving a message comprising information indicating that the new terminal wishes to pair with the access point;

sending a message to the managing access point, the message comprising information indicating that the terminal wishes to pair with the access point;

receiving from the managing access point a message comprising information representing at least one time slot for which the executing access point is authorized to establish a Wi-Fi Protected Setup (WPS) pairing session with the new terminal;

adding, in at least one beacon frame of the access point, information indicating that the pairing session is active, solely during the period of the at least one time slot for which the executing access point is authorized to establish a WPS pairing session with the new terminal.

* * * * *